United States Patent
Parks

Patent Number: 5,866,172
Date of Patent: Feb. 2, 1999

[54] OZONE TREATMENT FOR COMPOSITE PAPERBOARD/ POLYMER PACKAGE

[75] Inventor: Christopher J. Parks, Ellicott City, Md.

[73] Assignee: Westvaco Corporation, New York, N.Y.

[21] Appl. No.: 921,964

[22] Filed: Sep. 2, 1997

Related U.S. Application Data

[62] Division of Ser. No. 636,183, Jun. 20, 1996, Pat. No. 5,705,109.

[51] Int. Cl.$^6$ .......................... B29C 49/04; B29C 49/24
[52] U.S. Cl. ........................ 425/72.1; 425/503; 425/532
[58] Field of Search .................................. 425/72.1, 503, 425/516, 532

[56] References Cited

U.S. PATENT DOCUMENTS

| | | | |
|---|---|---|---|
| 3,184,358 | 5/1965 | Utz | 425/503 |
| 3,207,822 | 9/1965 | Makowski | 264/509 |
| 3,324,214 | 6/1967 | Schaich | 425/503 |
| 3,659,984 | 5/1972 | Krstolic | 425/72.1 |
| 3,771,931 | 11/1973 | Fischer et al. | 425/72.1 |
| 4,117,061 | 9/1978 | Jorgenso | 425/503 |
| 5,009,939 | 4/1991 | Goldberg | 264/516 |
| 5,122,399 | 6/1992 | Farrell et al. | 428/34.2 |
| 5,169,470 | 12/1992 | Goldberg | 156/244.14 |
| 5,232,653 | 8/1993 | Addeo et al. | 425/503 |

FOREIGN PATENT DOCUMENTS 7-125161  5/1995  Japan .

OTHER PUBLICATIONS

Derwent abstract 68–08597Q of French reference 1,522, 819A, Aug. 1993.
Derwent abstract 68–49014P of GB reference 1,074,663A, Aug. 1993.
Translation of Japanese reference 7–125161, printed May 16, 1995.
"Use of Ozone Can Improve Production Environment", by P. B. Sherman, Paper, Film and Converter, Oct. 1994, pp. 42–43.
"The Benefits of Ozone in Extrusion Coating", by P. B. Sherman, (internal publication) pp. 1–9, (no date).
"Some Attempts to Improve Adhesion in Extrusion Coating By Ozone Treatment", by C–J Johansson, (internal publication) dated Aug. 31, 1981, pp. 1–10.
Adhesion Promotion by Ozone Treatment, by B. H. Gregory and W. D. McIntyre, (internal publication) pp. 1–6.

Primary Examiner—Robert Davis

[57] ABSTRACT

In the manufacture of composite paperboard/polymer packages, the adhesion between the polymer component and paperboard component can be enhanced by treating the polymer film with a surface treatment, for example, ozone, before the two components are brought together. The present invention is particularly applicable to a blow molding process employing one or more paperboard blanks and a blow molded polymer film.

2 Claims, 3 Drawing Sheets

OZONE TREATMENT FOR COMPOSITE PAPERBOARD/ POLYMER PACKAGE

This is a divisional, of application Ser. No. 08/636.183 filed Jun. 20, 1996 now U.S. Pat. No. 5,705,109.

BACKGROUND OF INVENTION

The present invention relates generally to packaging, and more particularly to composite paperboard and plastic packaging for both liquid and dry products, including food products. More specifically, the present invention is directed to a process improvement for combining paperboard and a blow molded polymer film to produce a composite package.

Composite paperboard and polymer packaging of this type is well known as disclosed for instance in U.S. Pat. Nos. 5,009,939; 5,169,470; and 5,122,399, all assigned to the present assignee herein. Such packages combine the structural strength and superior printable surfaces of paperboard as an outer shell, and the liquid impervious, sanitary and barrier properties of a blow molded polymer film as an inner liner. In the past, printed matter has been applied directly to blow molded containers, or to labels which were subsequently applied to the containers particularly as shown in U.S. Pat. No. 3,207,822, but experience has shown that the combination of an outer shell of paperboard and an inner liner of a blow molded polymer film provides a superior product.

Generally, such composite packages are prepared from C1S (coated one side) paperboard wherein the polymer film is adhered to the uncoated surface of the paperboard leaving the coated surface for printing. The polymer film may be prepared from a single material such as polyethylene, polypropylene, polyester, etc., or it may comprise a coextruded sandwich consisting of one or more layers of polymer, adhesive tie materials and other barrier materials. In any event, some blow molding polymers do not adhere well to paperboard. Where such difficulties are encountered, it has been found necessary to apply an adhesive to the uncoated surface of the paperboard to achieve a good bond with the polymer film. However, as disclosed herein, a process improvement has been discovered which can be practiced during the blow molding process to achieve a good bond between the polymer film and the paperboard without the use of adhesives or the like.

SUMMARY OF INVENTION

The present invention is directed to a process improvement for combining paperboard and a blow molded polymer film to make a composite paperboard/polymer package. The term blow molding, as used herein, refers to the process by which a hollow, tubular parison of hot, viscous thermoplastic polymer or polymers is extruded into a mold cavity. When sufficient parison material is in place within the mold cavity and both ends of the parison tube are closed, as by pinching, an inflation needle is inserted into the closed parison and a pressurized gas is introduced into the parison. Expansion of the pressurized gas within the closed parison expands the parison against the walls of the mold thereby forming the desired article shape. Subsequently, the mold is chilled to solidify the polymer material of the parison and fix the shape of the article before the mold is opened to release the article so formed.

When a blow molding process is used to make composite paperboard/polymer packages as disclosed herein, the mold cavity is first lined with paperboard before the parison is introduced into the mold cavity. One or more blanks of paperboard material may be used for this purpose, particularly as disclosed in the aforementioned U.S. Pat. Nos. 5,009,939; 5,169,470; and 5,122,399. Nevertheless, as pointed out hereinbefore, the adhesive bond between the polymer film and the paperboard is not always successful. Thus, in accordance with the present invention, and in order to improve and enhance the adhesive bond between the polymer film and the paperboard, the parison of polymer film is preferably subjected to a surface treatment prior to being inflated in the mold cavity. This surface treatment may comprise a direct flame or sulfonation treatment, but preferably comprises a treatment whereby the parison is briefly exposed to a source of ozone. The treatment of the parison according to the present invention enhances the bond between the polymer film and the paperboard during the blow molding process. The mechanism by which this result is achieved is related to the level of surface oxidation of the parison achieved with the selected treatment. The oxidation produced by the preferred treatment disclosed herein yields highly polar surface groupings on the surface of the parison that form a strong bond with the paper substrate. It is known for example that a high temperature melt will adhere better to a substrate than a low temperature melt (see article entitled "Use of Ozone Can Improve Production Environment", by Philip B. Sherman, *Paper. Film and Foil Converter*, October 1994, pp. 42–43). This article also teaches that ozone treatment of a polymer material allows one to achieve a strong bond at lower melt temperatures when extrusion coating polymer materials onto paperboard. However, the article does not address the problems encountered during a blow molding process. Other publications which relate to the use of ozone for improving adhesion of polymer coatings include "The Benefits of Ozone in Extrusion Coating", by Philip B. Sherman, (internal publication-no date), "Some Attempts to Improve Adhesion in Extrusion Coating by Ozone Treatment", by C-J Johansson, (internal publication) dated Aug. 31, 1981; and, "Adhesion Promotion by Ozone Treatment", by B. H. Gregory, D. Michels and W. D. McIntyre, (internal publication—no date). However, none of these references deal with the use of ozone in blow molding. In fact, according to the present invention, the preferred treatment of the parison disclosed herein substantially eliminates entirely the need for an adhesive material between the polymer film and the paperboard.

DETAILED DESCRIPTION

Figure 6:
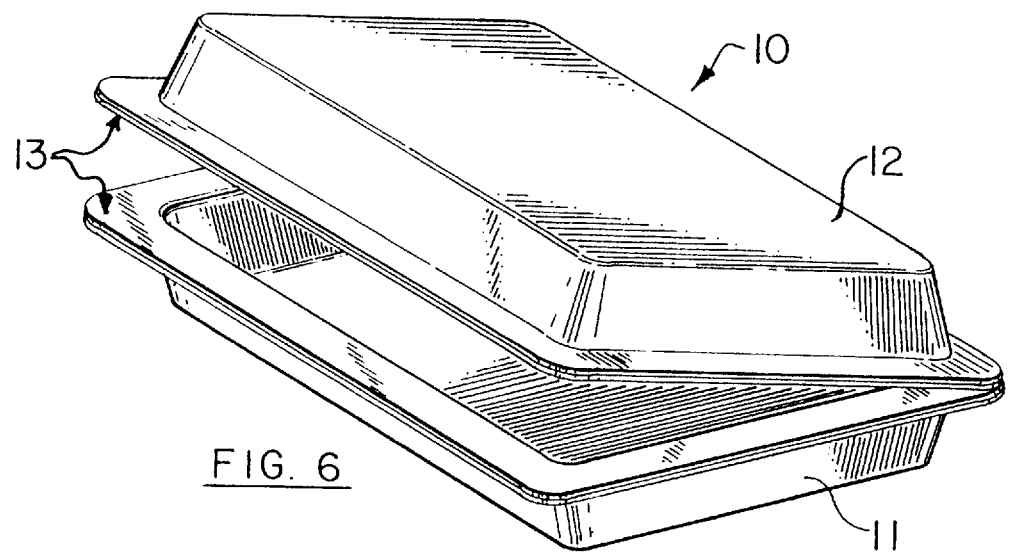
FIG. 6 is a prospective view of the composite package made according to FIGS. 2–5 after trimming; and, FIG. 7 is a top plan view of an exemplary parison treatment device according to the present invention.
Figure 7:
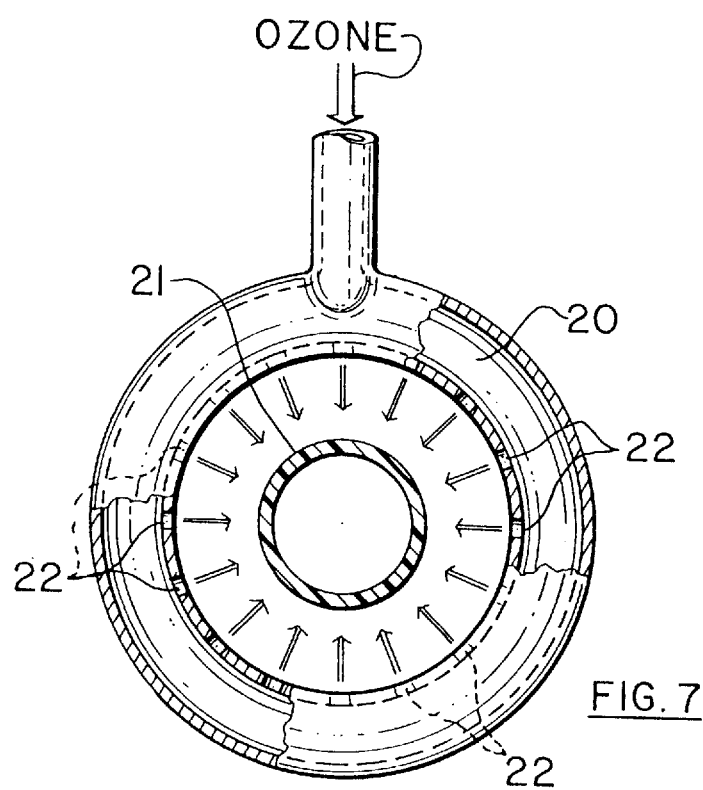

A typical example of a completed product made by the process of the present invention is shown in FIG. 6. In this example, the completed product comprises a clamshell type food container 10 prepared from two separate paperboard trays 11, 12 which are connected together by a portion of the inner liner 13 formed by a blow molded polymer film. The film is continuous throughout the interior of each tray element 11, 12, and a portion thereof forms a hinge between the two tray elements along one edge.

Figure 1:
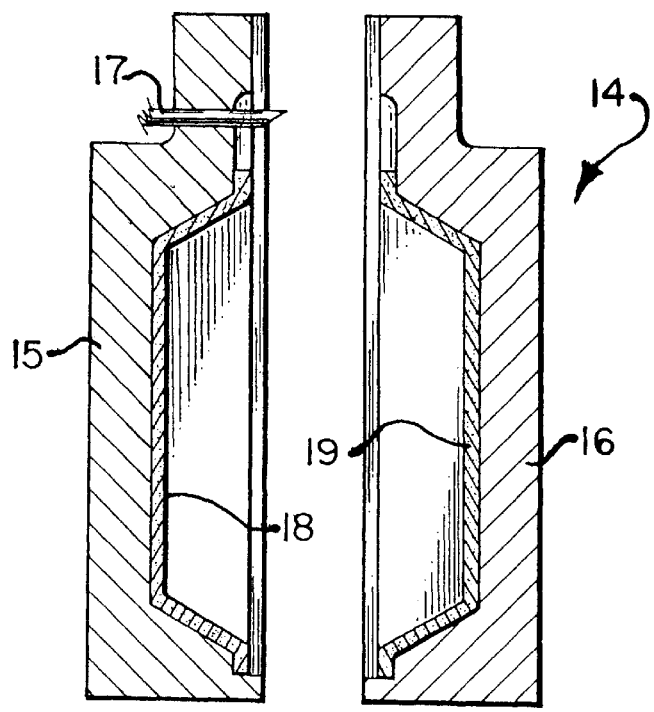
FIG. 1 is a side view in section of a typical blow mold unit showing the blow mold cavity with paperboard blanks positioned therein.

The polymer film is applied to the paperboard blanks to make the container by a blow molding process substantially as described in prior U.S. Pat. Nos. 5,009,939; 5,169,470; and 5,122,399. Specific reference is made to those disclosures for the mechanical details of the present invention. Nevertheless, in general, such products are made using a blow mold unit 14 substantially as shown in FIG. 1. Each blow mold unit includes a pair of mold halves 15, 16 and an inflation tube 17. The illustration in FIG. 1 shows a pair of paperboard blanks 18, 19, one in each mold half. A parison of blow mold polymer film is introduced into the mold unit, the inflation tube punctures the parison, and the parison is inflated so as to come into contact with the paperboard blanks in the mold halves.

Figure 2:
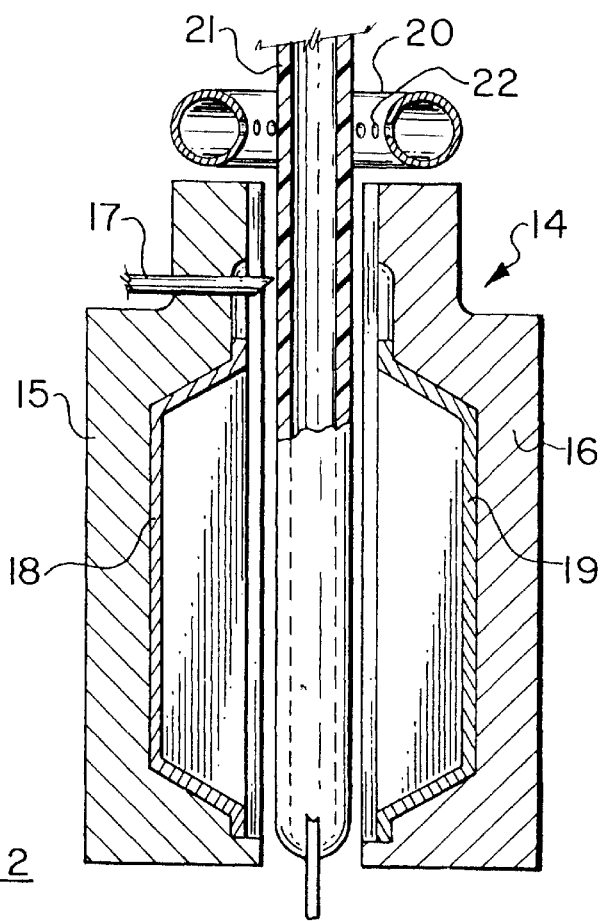
FIG. 2 is a view similar to FIG. 1 showing a parison treatment device mounted at the entrance to the blow mold unit with a polymer parison passing through the treatment device as it enters the blow mold cavity.
Figure 3:
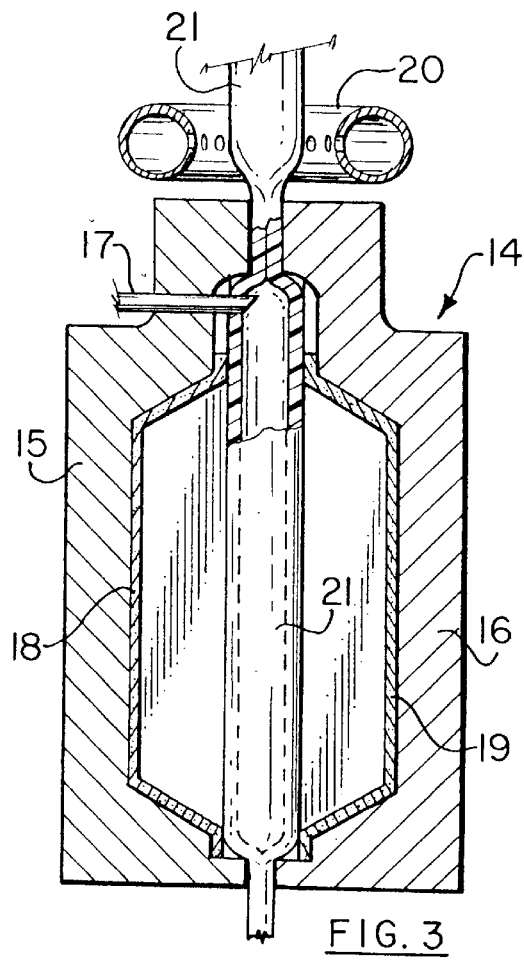
FIG. 3 illustrates the treated parison positioned within the blow mold unit prior to inflation.
Figure 4:
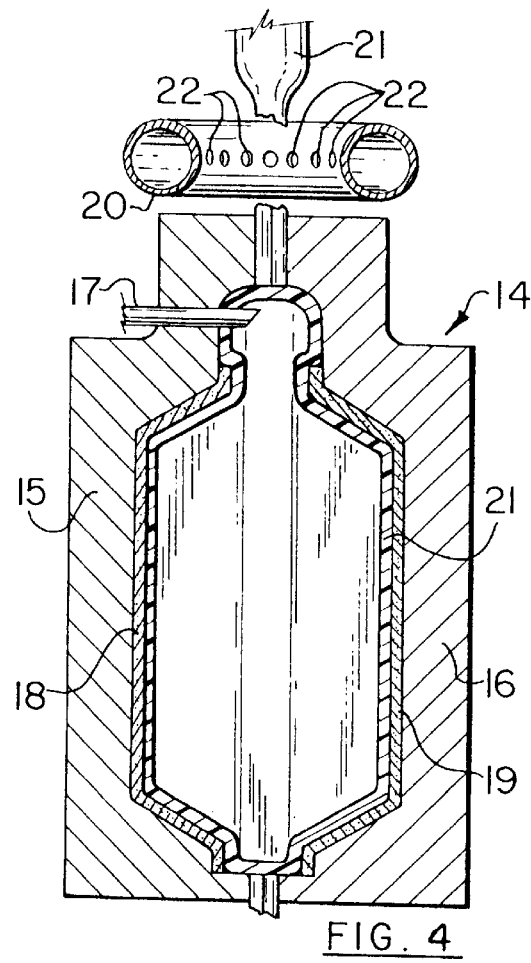
FIG. 4 illustrates the blow mold unit closed for parison inflation.
Figure 5:
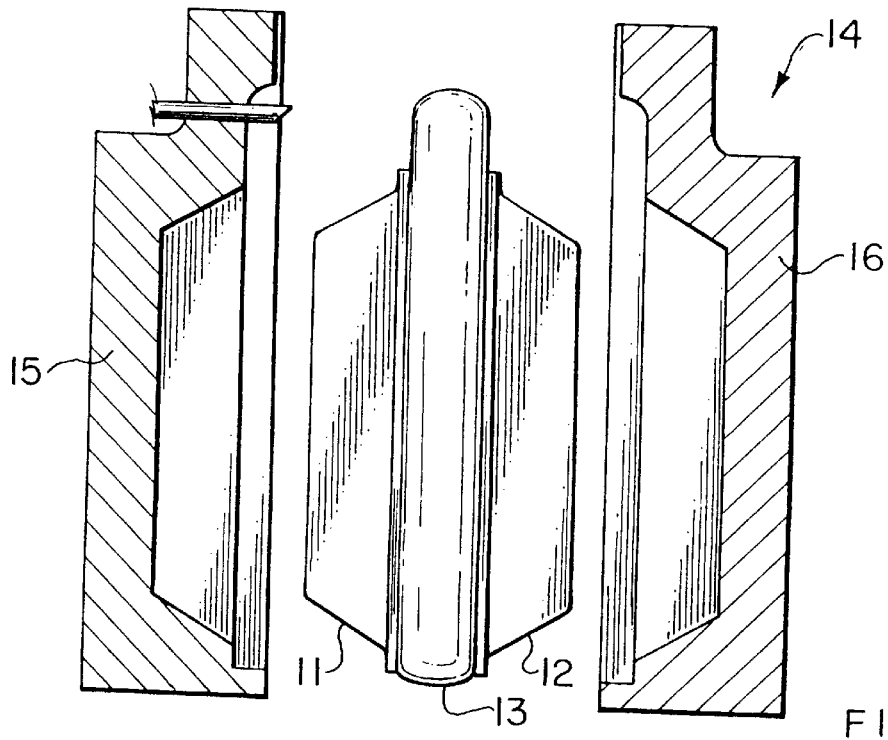
FIG. 5 shows the blow mold unit open after parison inflation.

FIG. 2 illustrates the improvement contemplated by the present invention to enhance the adhesion of the polymer film to the paperboard blanks. For this purpose, a treatment device, that in the specific embodiment shown takes the shape of a torodial-shaped applicator 20, is positioned at the entrance to the blow mold unit. Thus, as a polymer parison 21 is introduced into the blow mold unit 14 between the mold halves 15, 16, the parison passes through the torodial-shaped applicator 20 where the outer surface of the film is treated to a surface application of flame, sulfonation or preferably, ozone, to condition the surface of the polymer film that ultimately comes into contact with the paperboard blank halves. This result is accomplished according to the preferred embodiment shown by providing the torodial-shaped applicator with a plurality of openings on its inside so that the ozone gas or other treatment can be directed to the outer surface of the parison. In the embodiment shown, the parison passes through the center of the torus 20. For optimum performance, the applicator 20 should be as close as possible to the point where the polymer film contacts the paperboard. As shown in FIG. 2, in a typical application, the applicator 20 is located at the top of the blow mold unit 14 and small holes 22, 22 are drilled into the applicator 20 to allow the ozone or other treatment gas to escape. Nevertheless, it will be readily apparent to those skilled in the art that the treatment applicator 20 could take a different shape and the drilled holes 22, 22 could comprise a slit, slots or the like. Moreover, in other embodiments contemplated by the present invention, the applicator device 20 of the present invention may be designed to treat the parison while it is in the mold unit, or it may be incorporated as a part of the mold unit itself for more efficient operation.

Accordingly, various changes and modifications, other than those specifically described and illustrated herein, may become apparent to the skilled artisan once becoming acquainted with the present disclosure. Such features and modifications are therefore considered to be a part of the present invention, the scope of which is determined solely by the appended claims.

what is claimed is:

1. A blow molding apparatus comprising one or more blow mold units, each of said blow mold units including respective pairs of mold half sections which together define blow mold cavities, means for inserting and retaining article blanks of paperboard within each blow mold cavity, means for introducing a parison of blow mold polymer material into each blow mold cavity, and means for inflating each parison to cause it to expand and conform with the article blanks located within each blow mold cavity, the improvement comprising a means for treating the outer surface of each parison to increase its level of surface oxidation before the parison is inflated, said treating means further comprising a torodial-shaped applicator including openings on the interior thereof located at the entrance to each blow mold cavity to surround the parison, wherein an oxidizing source of energy selected from the group consisting of flame, sulfonation and ozone emitted from said opening contacts said parison in its hot, viscous thermoplastic state to thereby enhance the adhesive bond between the parison and the article blanks in said blow mold cavities.

2. The apparatus of claim 1 wherein the openings comprise one or more uniformly spaced holes, slots or a continuous slit.

* * * * *